US012754617B2

(12) United States Patent
Maly et al.

(10) Patent No.: US 12,754,617 B2
(45) Date of Patent: Oct. 6, 2026

(54) PROXIMITY DETECTION ON HUMAN MACHINE INTERFACE

(71) Applicant: Vertiv Corporation, Westerville, OH (US)

(72) Inventors: Douglas Keith Maly, Stubicke Toplice (HR); Bosko Mrkovic, Konjscina (HR)

(73) Assignee: Vertiv Corporation

( * ) Notice: Subject to any disclaimer, the term of this patent is extended or adjusted under 35 U.S.C. 154(b) by 0 days.

(21) Appl. No.: 19/207,678

(22) Filed: May 14, 2025

(65) Prior Publication Data

US 2025/0355503 A1 Nov. 20, 2025

Related U.S. Application Data

(60) Provisional application No. 63/647,832, filed on May 15, 2024.

(51) Int. Cl.

| | |
|---|---|
| ***G06F 3/01*** | (2006.01) |
| ***G01S 7/481*** | (2006.01) |
| ***G01S 17/04*** | (2020.01) |
| ***G06F 1/18*** | (2026.01) |
| ***G06F 1/3231*** | (2019.01) |
| ***G06F 1/3234*** | (2019.01) |
| ***G09G 3/20*** | (2006.01) |

(52) U.S. Cl.
CPC ............ *G06F 3/017* (2013.01); *G01S 7/4813* (2013.01); *G01S 17/04* (2020.01); *G06F 1/181* (2013.01); *G06F 1/3231* (2013.01); *G06F 1/3265* (2013.01); *G09G 3/2096* (2013.01); *G09G 2320/0626* (2013.01); *G09G 2354/00* (2013.01); *G09G 2360/144* (2013.01)

(58) Field of Classification Search
None
See application file for complete search history.

(56) References Cited

U.S. PATENT DOCUMENTS

2018/0196934 A1* 7/2018 Löthgren ............ H04L 63/0861
2022/0157082 A1* 5/2022 Lee ...................... G01B 11/026
2025/0085800 A1* 3/2025 Wang ..................... G01C 21/16

* cited by examiner

*Primary Examiner* — Ifedayo B Iluyomade
(74) *Attorney, Agent, or Firm* — Dickinson Wright PLLC

(57) ABSTRACT

A device, comprising: a human machine interface (HMI); a bezel framing the HMI; an aperture in the bezel; an ambient light sensor positioned in the aperture and configured to measure intensity of light in a surrounding environment of the device; a proximity detector configured to determine a proximity value of at least one of a user and an object relative to the device based on at least one measurement; and a control unit configured to activate a display of the HMI in response to the proximity value being within a proximity value range.

17 Claims, 4 Drawing Sheets

PROXIMITY DETECTION ON HUMAN MACHINE INTERFACE

CROSS REFERENCE TO RELATED APPLICATIONS

This U.S. Non-Provisional patent application claims the benefit of U.S. Provisional patent application Ser. No. 63/647,832, filed May 15, 2024, the contents of which are incorporated herein by reference in its entirety.

FIELD

The following description relates to technology related to Human Machine Interface (HMI) subsystems of a machine, system, or device.

BACKGROUND

A Human Machine Interface (HMI) is a user interface that connects a person to a machine, system, or device. Traditionally, this term has been applied to the industrial control systems that monitor and control machinery or processes. Recently, the use of the term has expanded to include the interface in consumer devices, such as smartphones, computers, and other electronic devices. An HMI encompasses elements that allow a user to communicate with a machine, which may include display screens, touch panels, motion sensors, and more.

The user experience in HMI is crucial as it directly impacts effectiveness, efficiency, and satisfaction with which users can interact with a machine or system. The quality of the user experience in HMIs can significantly influence how users perceive and adopt technology.

SUMMARY

An aspect of the disclosed embodiments includes a device comprising: a human machine interface (HMI); a bezel framing the HMI; an aperture in the bezel; an ambient light sensor positioned in the aperture and configured to measure intensity of light in a surrounding environment of the device; a proximity detector configured to determine a proximity value of an object relative to the device based on at least one measurement; and a control unit configured to activate a display of the HMI in response to the proximity value being within a proximity value range.

Another aspect of the disclosed embodiments includes a proximity detection system of a device including a human machine interface (HMI). The proximity detection system comprises: an ambient light sensor configured to measure intensity of light in a surrounding environment of the device; a proximity detector configured to determine a proximity value of an object relative to the device based on at least one measurement from the ambient light sensor; and a control unit configured to activate a display of the HMI in response to the proximity value being within a proximity value range.

Another aspect of the disclosed embodiments includes a method for detection of proximity of an object to a device including a human machine interface (HMI). The method comprises: measuring light intensity in an environment of the device; determining, using a proximity detector disposed behind a wall of a bezel of the device, a proximity value of at least one object relative to the device using infrared light and based on at least one light intensity measurement; and activating a display of the HMI in response to the proximity value being within a proximity value range.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

Figure 1:
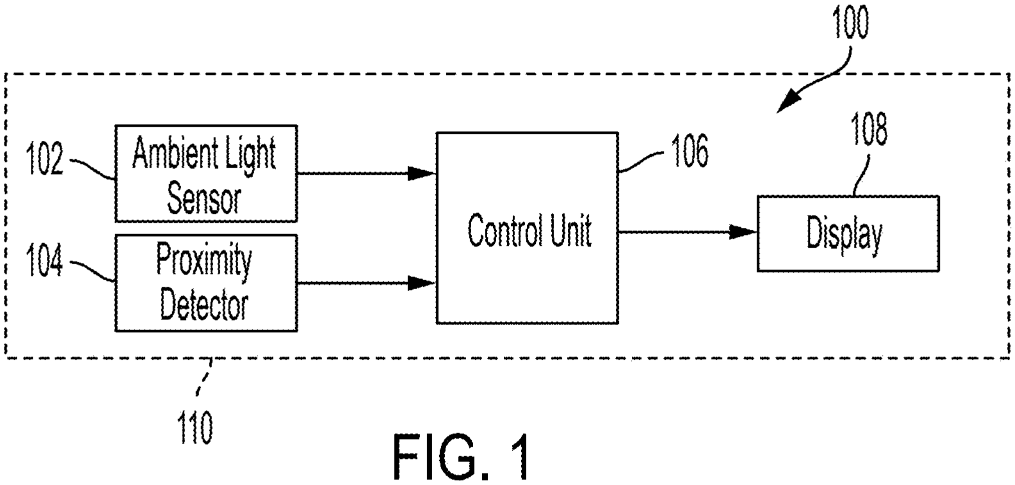
FIG. 1 is a block diagram of an exemplary embodiment of a human machine interface (HMI) subsystem, according to the principles of the present disclosure.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present disclosure described herein.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present specification and accompanying drawings disclose one or more embodiments that incorporate the features of the present disclosure. The scope of the present disclosure is not limited to the disclosed embodiments. The disclosed embodiments merely exemplify the present disclosure, and modified versions of the disclosed embodiments are also encompassed by the present disclosure. Embodiments of the present disclosure are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Embodiments disclosed herein are directed to a human machine interface (HMI) subsystem configured to enhance user interaction with a device. The HMI subsystem includes a configurable proximity detection capability. Additionally, the HMI subsystem allows for the activation and deactivation of a display of the HMI subsystem and adjustment of the brightness of the display (e.g., activation of a Liquid Crystal Display (LCD) and adjustment of its backlight), responding to the proximity of a user or an object to the device.

The enhanced HMI subsystem provides an improved user experience by its ability to automatically adjust a device's display and backlight in response to the user's proximity, particularly in low ambient light environments. The HMI subsystem can activate the display as the user approaches (e.g., through hand gestures), providing sufficient illumination to interact with the device without manually adjusting settings. This ensures that the display is easily viewable and the device is readily accessible, enhancing usability and convenience, particularly in dimly lit conditions. Conversely, when the user withdraws, the HMI subsystem can dim or turn off the display to conserve power.

To help illustrate this, FIG. 1 will now be described. In particular, FIG. 1 is a block diagram of an exemplary embodiment of the HMI subsystem including configurable proximity detection capability. As generally illustrated in FIG. 1, an HMI subsystem 100 of a device 110 may include an ambient light sensor 102, a proximity detector 104, a control unit 106, and a display 108.

In FIG. 1, ambient light sensor 102 may be configured to measure intensity of light in a surrounding environment of device 110. More specifically, ambient light sensor 102 may measure the intensity of the light that surrounds it within environments where device 110 is used. In some embodiments, ambient light sensor 102 may be a photodiode, which converts light into electrical current. Further, when light hits the photodiode, it generates a photocurrent. The intensity of this current changes proportionally with the brightness of the ambient light. This current may then be converted into a voltage, which can be measured and interpreted, for example, by control unit 106. In some embodiments, analog-to-digital converters may be used to turn analog voltages into a digital signal that control unit 106 can process. Ambient light sensor 102 is further configured to provide ambient light measurement information and related data to control unit 106.

In some embodiments, ambient light sensor 102 may periodically (e.g., once a minute, once a second, etc.,) measure a level of environmental light. The frequency of these measurements can be pre-set or adjusted based on a device's activity or the rate of change in light conditions in the surrounding environment. For instance, if lighting in a room in which device 110 is located is motion activated, the sampling rate of ambient light sensor 102 may be increased to quickly adapt to the changing conditions in the room. HMI subsystem 100 may use these measurements to establish baseline lighting conditions for the environment where the device is located. Ambient light sensor 102 may be capable of functioning in various ambient light conditions.

In FIG. 1, proximity detector 104 may be configured to determine a proximity value of at least one of a user and an object relative to device 110. Proximity value as used herein refers to a value that quantifies the closeness of a user or object to a device. In some embodiments, proximity detector 104 may determine a proximity value of a user or object relative to the device by emitting a light signal and measuring the intensity of the reflected signal. More specifically, proximity detector 104 may emit a signal (e.g., infrared (IR) light, ultrasonic waves, or electromagnetic fields) and the emitted signal reflects off an object and returns to proximity detector 104. Proximity detector 104 detects this reflected signal. Proximity detector 104 may measure the time it takes for the single to return and/or the intensity of the received signal. For IR sensors, for instance, the time delay between emission and detection is directly related to distance. In some embodiments, proximity detector 104 may translate this calculated distance into a proximity value. Proximity detector 104 is further configured to provide the proximity value and/or or related data to control unit 106.

In FIG. 1, control unit 106 is configured to receive an ambient light measurement from ambient light sensor 102 and a proximity value from proximity detector 104. Control unit 106 is further configured to interpret an ambient light measurement and a proximity value. Based on the values, control unit 106 is configured to trigger various actions. For example, control unit 106 may compare a proximity value to a predefined threshold range (e.g., five inches of a device). If a user or object is detected within this predefined threshold range, control unit 106 may cause the activation of display 108 by sending a command to display 108, instructing display 108 to activate. Conversely, when a user or object moves away from device 110 outside the threshold range, control unit 106 may cause the deactivation of display 108 by sending a command to display 108, instructing display 108 to deactivate.

As another example, control unit 106 may process an ambient light measurement to adjust brightness of a display. In some embodiments, ambient light sensor 102 may continuously measure the intensity of the surrounding light and sends this data to control unit 106. Control unit 106 may map the ambient light measurement to a brightness level based on pre-defined settings. In some embodiments, this mapping could be a direct correlation. In addition, in some embodiments, this mapping could account for user preferences, battery level, or context of use. Control unit 106 may process the mapped brightness level to determine the appropriate display brightness. Control unit 106 may cause adjustment of brightness of display 108 by sending a command to display 108, instructing it to adjust the backlight or screen brightness to a calculated level.

In some embodiments, control unit 106 receives measurement data from ambient light sensor 102 and interprets the measurement data and applies predetermined thresholds to determine whether the change in light intensity necessitates an adjustment to the HMI's settings. For instance, a sudden decrease in light might trigger the display brightness of the HMI. These adjustments may be smooth and gradual, enhancing the user experience by providing a display that is easy to view in any lighting condition.

In some embodiments, proximity detector 104 may be configured to determine a proximity value of a user and an object relative to device 110 based on at least one measurement from ambient light sensor 102. For example, ambient light sensor 102 may measure a baseline ambient light intensity in the environment of device 110 and transmit this data to control unit 106. Control unit 106 may receive the ambient light measurement data and establish initial settings for proximity detector 104 based on the ambient light measurement data. Accordingly, proximity detector 104 may emit a signal (e.g., infrared light) at a frequency determined by control unit 106. Additionally, control unit 106 may take into account a current ambient light measurement from ambient light sensor 102 to adjust sensitivity of proximity detector 104 and signal interpretation algorithms. For example, if ambient light sensor 102 detects bright sunlight, which includes infrared light, control unit 106 may adjust the sensitivity of an IR-based proximity sensor to account for high ambient IR levels. An object as used herein refers to any physical entity whose presence and location relative to the device is detectable by sensors of HMI subsystem 100. This includes inanimate items as well as living entities, such as a human user.

Further, in some embodiments, control unit 106 may use ambient light levels to adjust the thresholds at which proximity detector 104 is triggered. In bright conditions, the threshold may be set higher to avoid false positives due to the IR content of sunlight. Still yet, in some embodiments, control unit 106 may continuously monitor measurements of ambient light sensor 102 for sudden changes that could indicate the presence of an object. For instance, if an object approaches device 110, the object may cast a shadow, causing a measurable decrease in baseline ambient light measured in the environment. Control unit 106 may use pre-defined criteria to evaluate the ambient light measurements, looking for patterns consistent with an object moving closer to or further away from ambient light sensor 102. Control unit 106 may also cross-reference this with proximity values from proximity detector 104. If proximity detector 104 corroborates the ambient light measurements, control unit 106 may make a more accurate assessment of proximity.

Figure 2:
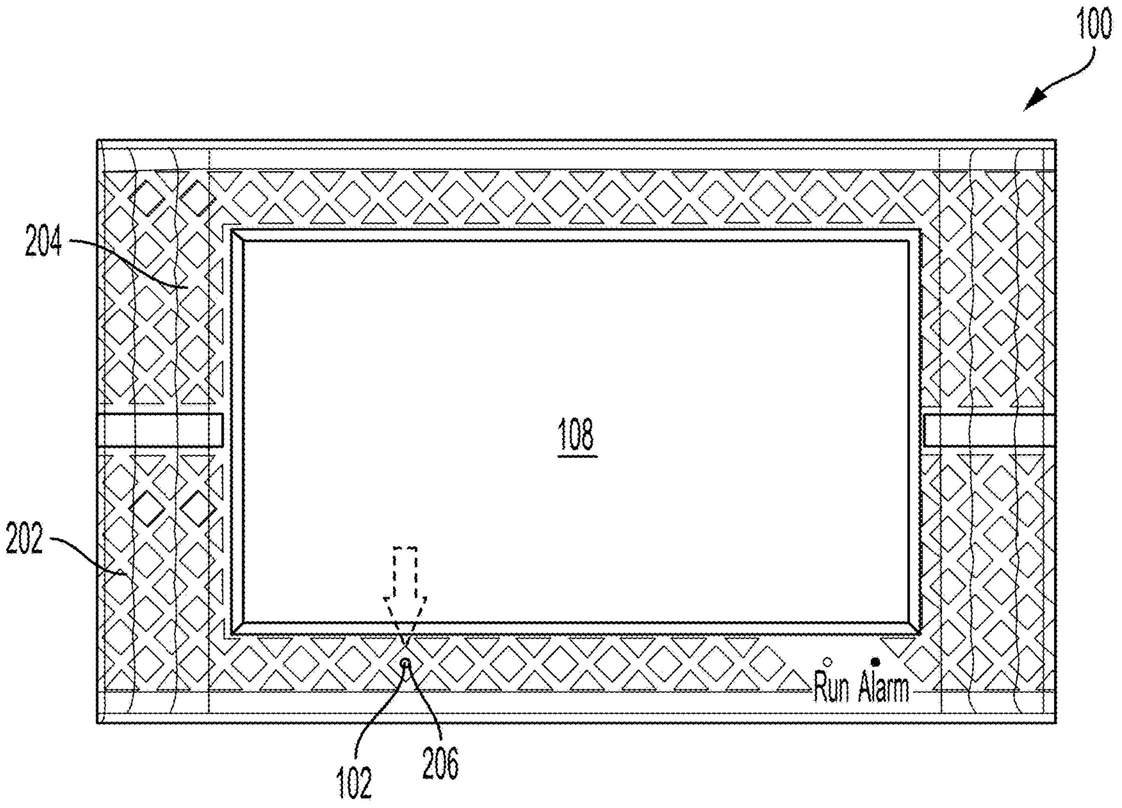
FIGS. 2 and 3 illustrate exemplary embodiments of components of a HMI subsystem, according to the principles of the present disclosure.
Figure 3:
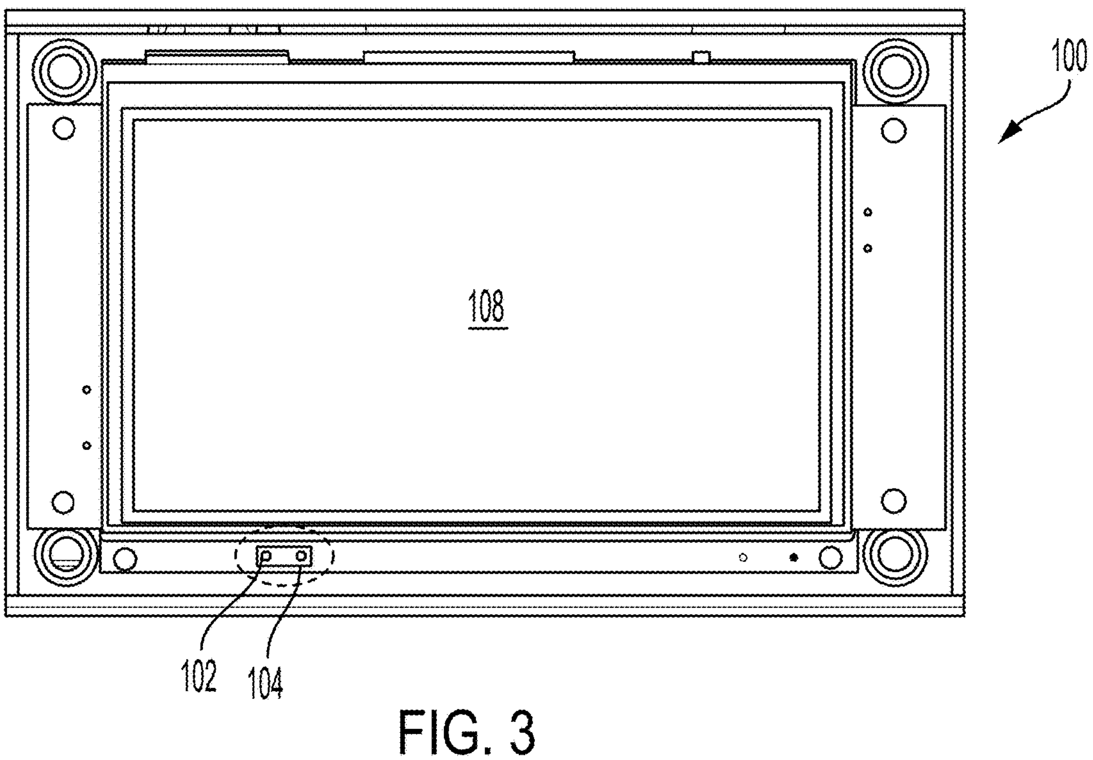

FIGS. 2 and 3 illustrate exemplary embodiments of components of a HMI subsystem. In particular, FIG. 2 depicts HMI subsystem 100, which includes display 108 and ambient light sensor 102, and a bezel 202. Bezel 202 is configured to encircle and frame display 108. Further, as shown in FIG. 2, bezel 202 includes an aperture 206, and ambient light sensor 102 is positioned in aperture 206. In some embodiments, proximity detector 104 is positioned behind a wall 204 of bezel 202. Wall 204 of bezel 202 may be comprised of a plastic material transparent to infrared light, such that wall 204 of bezel 202 does not obstruct IR based proximity detection.

FIG. 3 depicts HMI subsystem 100 but notably without bezel 202, as shown in FIG. 2. In FIG. 3, with bezel 202 removed, proximity detector 104 is exposed and positioned adjacent to ambient light sensor 102.

In some embodiments, proximity detector 104 includes an Application Specific Integrated Circuit (ASIC) for proximity detection. For example, an ASIC would be optimized to process signals that detect the presence or distance of a user or an object from device 110. More specifically, the ASIC may be configured to emit detection signals, receive and process reflected signals, determine the distance (e.g., based on time-of-flight calculations or signal strength), and communicate with other components of HMI subsystem 100 to initiate a response (e.g., activate or deactivate display 108) based on the proximity detection.

In some embodiments, HMI subsystem 100 is configured to provide to the user configurable settings for sensitivity of the proximity sensor system and delay for display deactivation. For example, a user may adjust how responsive proximity detector 104 is to the presence of an object and user and how quickly the display responds to an object or user moving away from device 110. The user may input these values to HMI subsystem 100 through display 108 or other input devices (e.g., a keyboard).

In some embodiments, HMI subsystem 100 may be configured to recognize hand gestures of a user. For example, proximity detector 104 may detect one or more proximity values that represent movement of the user's hand in front of device 110. Control unit 106 interprets these gestures from the one or more proximity values and accordingly applies changes to display 108. For instance, a swipe gesture may indicate that a user wants the brightness of the screen to be adjusted (such as swipe left may represent diming display 108 and swipe right may represent increasing brightness of display 108). As another example, a hovering hand in front of device 110 might activate or deactivate display 108.

Figure 4:
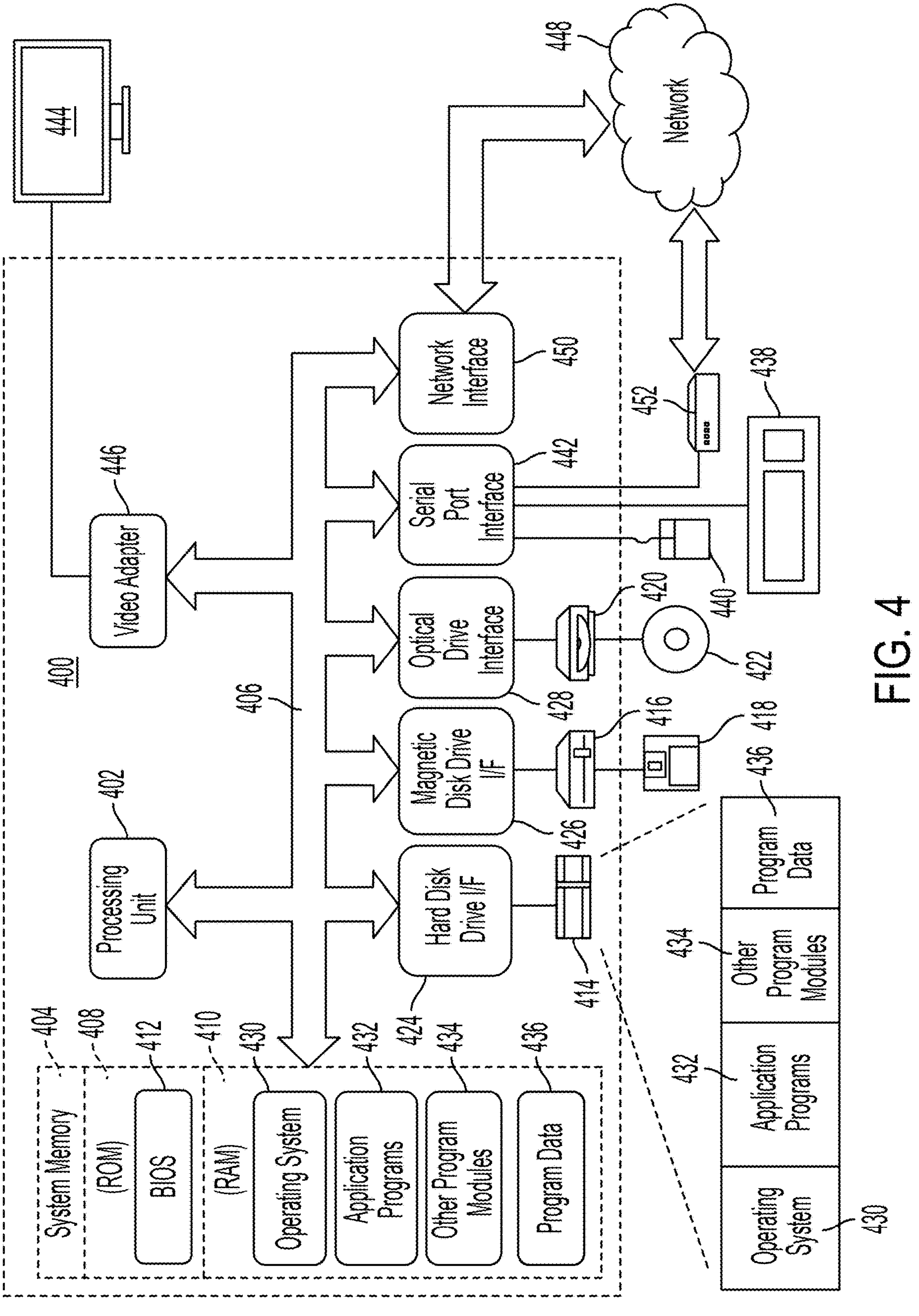
FIG. 4 is a block diagram of an example computing device that may be used to implement embodiments, according to the principles of the present disclosure.

FIG. 4 depicts an example processor-based computer system 400 that may be used to implement various embodiments described herein, such as any of the embodiments described in the above and in reference to FIGS. 1-3. For example, processor-based computer system 400 may be used to implement any of the components of HMI subsystem 100 as described above in reference to FIGS. 1-3. The description of processor-based computer system 400 provided herein is provided for purposes of illustration and is not intended to be limiting. Embodiments may be implemented in further types of computer systems, as would be known to persons skilled in the relevant art(s).

As shown in FIG. 4, processor-based computer system 400 includes one or more processors, referred to as processor circuit 402, a system memory 404, and a bus 406 that couples various system components including system memory 404 to processor circuit 402. Processor circuit 402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 402 may execute program code stored in a computer readable medium, such as program code of operating system 430, application programs 432, other programs 434, etc. Bus 406 represents one or more of any of several types of bus structures, including a memory bus or memory controller, a peripheral bus, an accelerated graphics port, and a processor or local bus using any of a variety of bus architectures. System memory 404 includes read only memory (ROM) 408 and random access memory (RAM) 410. A basic input/output system 412 (BIOS) is stored in ROM 408.

Processor-based computer system 400 also has one or more of the following drives: a hard disk drive 414 for reading from and writing to a hard disk, a magnetic disk drive 416 for reading from or writing to a removable magnetic disk 418, and an optical disk drive 420 for reading from or writing to a removable optical disk 422 such as a CD ROM, DVD ROM, or other optical media. Hard disk drive 414, magnetic disk drive 416, and optical disk drive 420 are connected to bus 406 by a hard disk drive interface 424, a magnetic disk drive interface 426, and an optical drive interface 428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 430, one or more application programs 432, other programs 434, and program data 436. Application programs 432 or other programs 434 may include, for example, computer program logic (e.g., computer program code or instructions) for implementing the systems described above, including the embodiments described in reference to FIGS. 1-3 and FIG. 5.

A user may enter commands and information into processor-based computer system 400 through input devices such as keyboard 438 and pointing device 440. Other input devices (not shown) may include a microphone, joystick, game pad, satellite dish, scanner, and a touch screen and/or touch pad, a voice recognition system to receive voice input, a gesture recognition system to receive gesture input, or the like. These and other input devices are often connected to processor circuit 402 through a serial port interface 442 that is coupled to bus 406, but may be connected by other interfaces, such as a parallel port, game port, or a universal serial bus (USB).

A display screen 444 is also connected to bus 406 via an interface, such as a video adapter 446. Display screen 444 may be external to or incorporated in processor-based computer system 400. Display screen 444 may display information, as well as being a user interface for receiving user commands and/or other information (e.g., by touch, finger gestures, virtual keyboard, etc.). In addition to display screen 444, processor-based computer system 400 may include other peripheral output devices (not shown) such as speakers and printers.

Processor-based computer system 400 is connected to a network 448 (e.g., the Internet) through an adaptor or network interface 450, a modem 452, or other means for establishing communications over the network. Modem 452, which may be internal or external, may be connected to bus 406 via serial port interface 442, as shown in FIG. 4, or may be connected to bus 406 using another interface type, including a parallel interface.

As used herein, the terms "computer program medium," "computer-readable medium," and "computer-readable storage medium" are used to generally refer to physical hardware media such as the hard disk associated with hard disk drive 414, removable magnetic disk 418, removable optical disk 422, other physical hardware media such as RAMs, ROMs, flash memory cards, digital video disks, zip disks, MEMs, nanotechnology-based storage devices, and further types of physical/tangible hardware storage media (including system memory 404 of FIG. 4). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 432 and other programs 434) may be stored on the hard disk, magnetic disk, optical disk, ROM, RAM, or other hardware storage medium. Such computer programs may also be received via network interface 450, serial port interface 442, or any other interface type. Such computer programs, when executed or loaded by an application, enable processor-based computer system 400 to implement features of embodiments discussed herein. Accordingly, such computer programs represent controllers of processor-based computer system 400.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Figure 5:
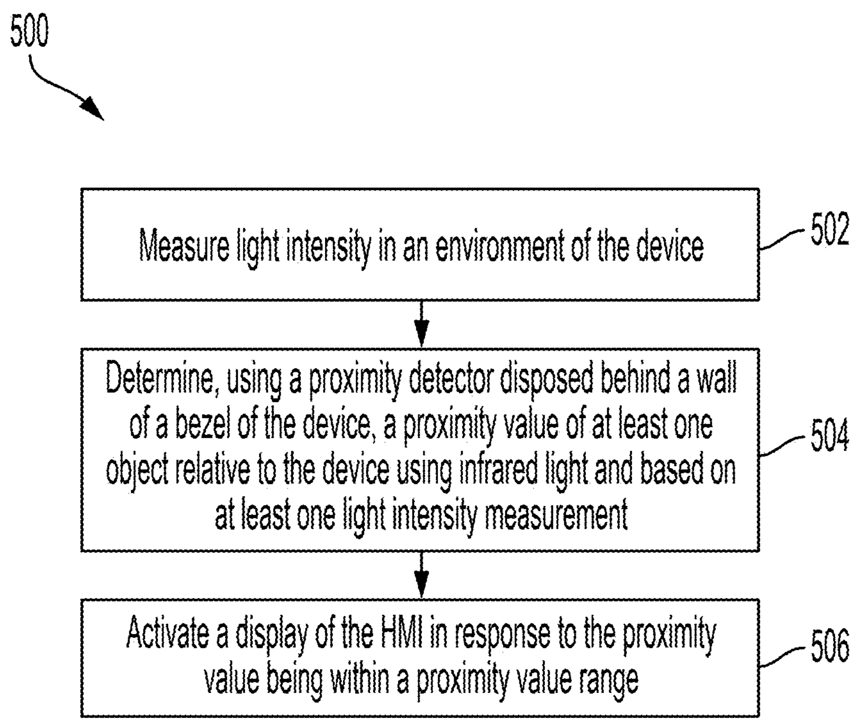
FIG. 5 depicts a flowchart of a method for detection of proximity of an object to a device including a HMI, according to the principles of the present disclosure.

To explore this in further detail, FIG. 5 is described. FIG. 5 depicts a flowchart 500 of a method for detection of proximity of an object to a device including a HMI, according to an example embodiment. As shown in FIG. 5, the method of flowchart 500 begins at step 502. In step 502, light intensity is measured in an environment of the device.

At step 504 in flowchart 500, using a proximity detector disposed behind a wall of a bezel of the device, a proximity value of at least one object relative to the device is determined using infrared light and based on at least one light intensity measurement.

At step 506 in flowchart 500, a display of the HMI is activated in response to the proximity value being within a proximity value range.

In some embodiments, a targeted approach to activating or deactivating an HMI of the device may be employed.

More specifically, the HMI subsystem disclosed herein may be configured to discern the presence of specific objects.

In some embodiments, a device, comprises: a human machine interface (HMI); a bezel framing the HMI; an aperture in the bezel; an ambient light sensor positioned in the aperture and configured to measure intensity of light in a surrounding environment of the device; a proximity detector configured to determine a proximity value of an object relative to the device based on at least one measurement; and a control unit configured to activate a display of the HMI in response to the proximity value being within a proximity value range.

In some embodiments, the proximity detector includes an Application Specific Integrated Circuit (ASIC) to receive the signal from the proximity detector and perform signal processing for proximity detection.

In some embodiments, the control unit is further configured to adjust brightness of the display of the HMI based on the at least one measurement from the ambient light sensor.

In some embodiments, the control unit is further configured to deactivate the display after a predetermined delay when the object is no longer detected by the device.

In some embodiments, the HMI is configured to provide to configurable settings for sensitivity of the device and delay for display deactivation.

In some embodiments, the ambient light sensor is capable of functioning in various ambient light conditions.

In some embodiments, the proximity detector is positioned behind a wall of the bezel and further configured to detect a presence of the object using infrared light.

In some embodiments, the wall of the bezel is comprised of a plastic material transparent to infrared light.

In some embodiments, a proximity detection system of a device including a human machine interface (HMI), comprises: an ambient light sensor configured to measure intensity of light in a surrounding environment of the device; a proximity detector configured to determine a proximity value of an object relative to the device based on at least one measurement from the ambient light sensor; and a control unit configured to activate a display of the HMI in response to the proximity value being within a proximity value range.

In some embodiments, the proximity detector includes an Application Specific Integrated Circuit (ASIC) for proximity detection.

In some embodiments, the control unit is further configured to adjust brightness of the display of the HMI based on the at least one measurement from the ambient light sensor.

In some embodiments, the control unit is further configured to deactivate the display after a predetermined delay when the object is no longer detected by the proximity detection system.

In some embodiments, the HMI is configured to provide configurable settings for sensitivity of the proximity detection system and delay for display deactivation.

In some embodiments, the ambient light sensor is capable of functioning in various ambient light conditions.

In some embodiments, the proximity detector is positioned behind a wall of a bezel of the device and further configured to detect a presence of the object using infrared light.

In some embodiments, the wall of the bezel is comprised of a plastic material transparent to infrared light.

In some embodiments, a method for detection of proximity of an object to a device including a human machine interface (HMI), the method comprises: measuring light intensity in an environment of the device; determining, using a proximity detector disposed behind a wall of a bezel of the device, a proximity value of at least one object relative to the device using infrared light and based on at least one light intensity measurement; and activating a display of the HMI in response to the proximity value being within a proximity value range.

In some embodiments, the at least one object includes at least one of an animate object and an inanimate object.

In some embodiments, the method further comprises: deactivating the display after a predetermined delay when the at least one object is no longer detected by the proximity detector.

In some embodiments, the method further comprises: providing configurable settings for sensitivity of the proximity detector and delay for display deactivation.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A device, comprising:

a human machine interface (HMI) comprising a display;

an ambient light sensor configured to repeatedly measure an intensity of ambient light;

a proximity detector configured to detect a plurality of proximity values of an object, wherein the plurality of proximity values represent movement of the object, and wherein the proximity detector is configured to emit a signal and to detect a reflected signal reflected from the object; and a control unit configured to identify a gesture based on the plurality of proximity values control the display based on the gesture; and control a frequency of the signal based on the intensity of the ambient light.

2. The device of claim 1, wherein the proximity detector comprises:

an application specific integrated circuit (ASIC) configured to determine the plurality of proximity values based on at least one of a time of the reflected signal and an intensity of the reflected signal.

3. The device of claim 1, wherein the control unit is further configured to adjust a brightness of the display based on the intensity of the ambient light.

4. The device of claim 1, wherein the control unit is further configured to deactivate the display based on a predetermined delay having passed after a proximity value which is outside of a proximity value range.

5. The device of claim 1, wherein the control unit is further configured to control the device to thereby provide an interface for adjusting one or more configurable settings.

6. The device of claim 5, wherein the one or more configurable settings include a sensitivity setting and a deactivation setting.

7. The device of claim 1, further comprising:

a bezel disposed around an outer periphery of the display, wherein the proximity detector is positioned behind a wall of the bezel and is further configured to determine the plurality of proximity values using infrared light.

8. The device of claim 7, wherein the wall of the bezel is comprised of a plastic material transparent to infrared light.

9. A control method of a display of a human machine interface (HMI), the control method comprising:

measuring an intensity of ambient light in an environment of the HMI;

detecting a plurality of proximity values of an at object, wherein the plurality of proximity values represent movement of the object, and wherein detecting the plurality of proximity values comprises emitting a signal and detecting a reflected signal reflected from the object;

controlling a frequency of the signal based on the intensity of the ambient light;

identifying a gesture based on the plurality of proximity values; and controlling the display based on the gesture.

10. The method of claim 9, further comprising:

deactivating the display based on a predetermined delay having passed after a proximity value which is outside of a proximity value range.

11. The device of claim 1, wherein the control unit is configured to control a brightness of the display based on the gesture.

12. The device of claim 1, wherein the gesture comprises a swipe of a user's hand.

13. The device of claim 1, wherein the control unit is further configured to activate the display in response to a proximity value being within a proximity value range.

14. The control method of claim 9, wherein the detecting the plurality of proximity values further comprises:

determining the plurality of proximity values based on at least one of a time of the reflected signal and an intensity of the reflected signal.

15. The control method of claim 9 wherein the controlling the display comprises controlling a brightness of the display based on the gesture.

16. The control method of claim 9, wherein the gesture comprises a swipe of a user's hand.

17. The control method of claim 9, further comprising activating the display in response to a proximity value being within a proximity range.

* * * * *